US005920057A

United States Patent [19]

Sonderegger et al.

[11] Patent Number: 5,920,057

[45] Date of Patent: Jul. 6, 1999

[54] PROCESS AND DEVICE FOR MEASURING THE OCCUPANCY IN PASSENGER TRANSPORTATION MEANS

[75] Inventors: Wilhelm Sonderegger, Dornbirn; Georg Kühne, Rankwill, both of Austria

[73] Assignee: VOS Verkehrs-Optimierungs-System GmbH & Co. KG, Australia

[21] Appl. No.: 08/583,060

[22] PCT Filed: Jun. 1, 1994

[86] PCT No.: PCT/EP94/01778

§ 371 Date: Dec. 22, 1995

§ 102(e) Date: Dec. 22, 1995

[87] PCT Pub. No.: WO95/00928

PCT Pub. Date: Jan. 5, 1995

[30] Foreign Application Priority Data

| | | | |
|---|---|---|---|
| Jun. 22, 1993 | [DE] | Germany | 43 20 512 |
| Jul. 3, 1993 | [DE] | Germany | 43 22 160 |

[51] Int. Cl.$^6$ .......... B60Q 1/26

[52] U.S. Cl. .......... 235/384; 235/375; 235/380

[58] Field of Search .......... 235/384, 375, 235/380; 340/434, 439

[56] References Cited

U.S. PATENT DOCUMENTS

| | | | |
|---|---|---|---|
| 3,997,866 | 12/1976 | Taylor et al. | 340/1 |
| 4,001,777 | 1/1977 | Alexander | 340/68 |
| 4,336,522 | 6/1982 | Graham | 340/52 |
| 4,477,874 | 10/1984 | Ikuta et al. | 364/424 |
| 4,528,679 | 7/1985 | Shahbaz et al. | 377/6 |
| 4,977,501 | 12/1990 | Lefevre | 364/401 |
| 5,138,638 | 8/1992 | Frey | 377/6 |
| 5,206,643 | 4/1993 | Eckelt | 340/932.2 |
| 5,293,160 | 3/1994 | Kurozu et al. | 340/825.32 |
| 5,446,266 | 8/1995 | Beuk et al. | 235/382.5 |
| 5,485,347 | 1/1996 | Miura | 364/557 |
| 5,508,693 | 4/1996 | Wake | 340/825.31 |

FOREIGN PATENT DOCUMENTS

| | | | |
|---|---|---|---|
| 0020100 | 2/1977 | Japan | 235/384 |
| 2086577 | of 0000 | United Kingdom . | |
| 1258913 | 12/1971 | United Kingdom | 235/384 |
| 9114237 | 9/1991 | WIPO | 235/384 |

*Primary Examiner*—Donald Hajec
*Assistant Examiner*—Douglas X. Rodriguez
*Attorney, Agent, or Firm*—Fulbright & Jaworski L.L.P.

[57] ABSTRACT

A process for tamper-proof measuring of vehicle occupancy in passenger transportation device whereby a counting of the transported persons is carried out and whereby the counting of passengers riding in the people transportation device takes place by individually assigned detectors, characterized in that measuring is carried out in such a manner that a manipulation of the measuring with the purpose of increasing the number of passenger is impossible or at least made very difficult and that data acquired is processed, stored and whereby the measurement is executed several times or continuously and whereby the measuring device is disposed completely inside the vehicle. The present invention also provides a device for the execution of the process.

11 Claims, 3 Drawing Sheets

FIG. 1
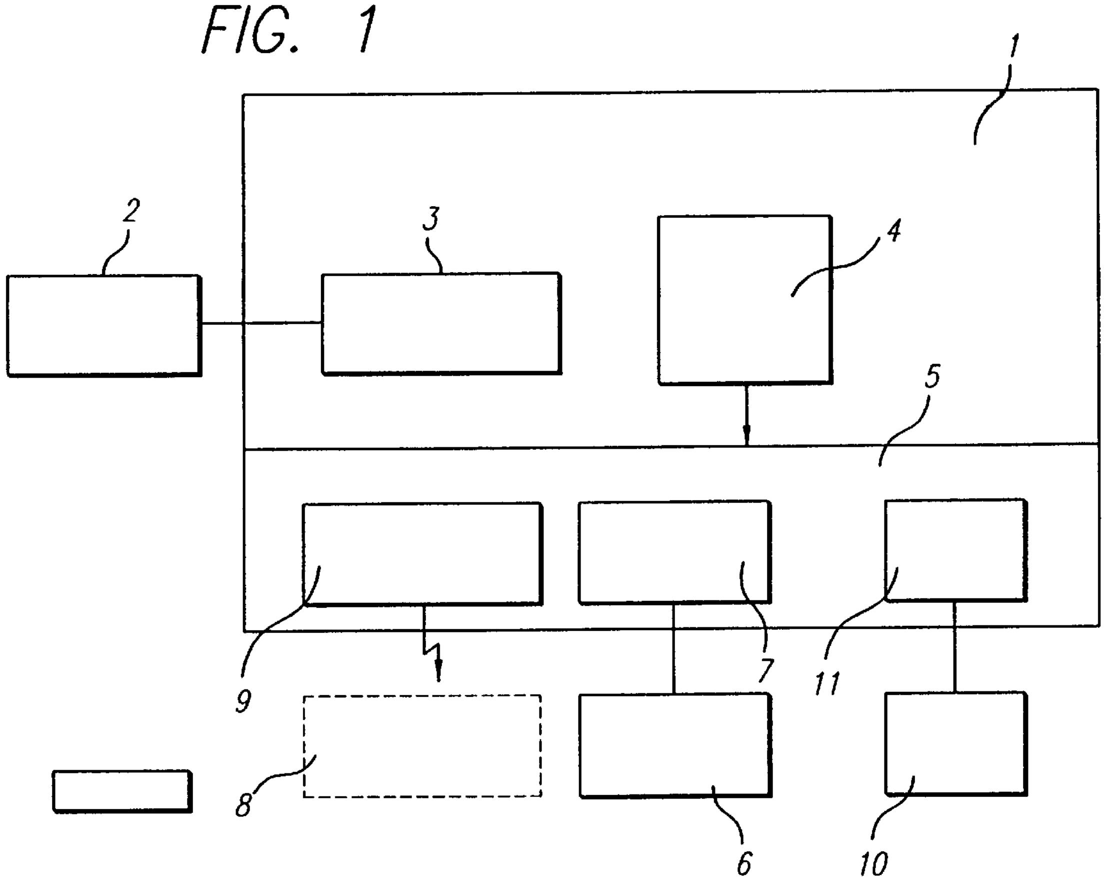
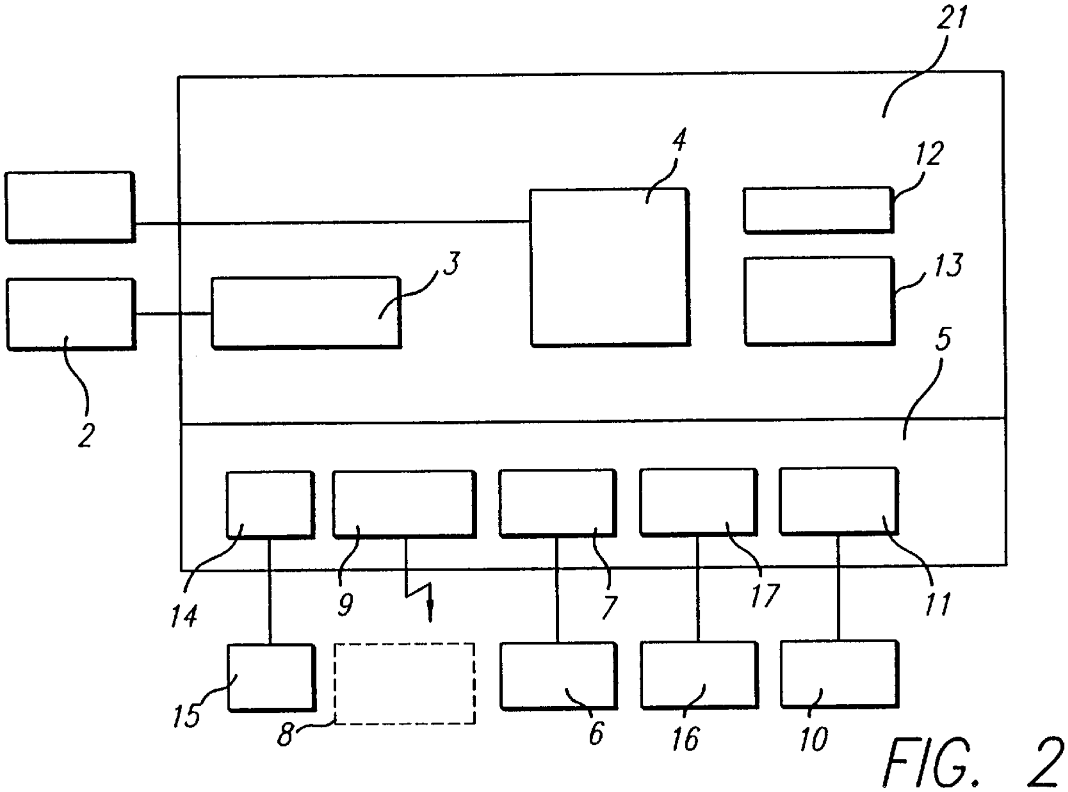
FIG. 2

FIG. 3
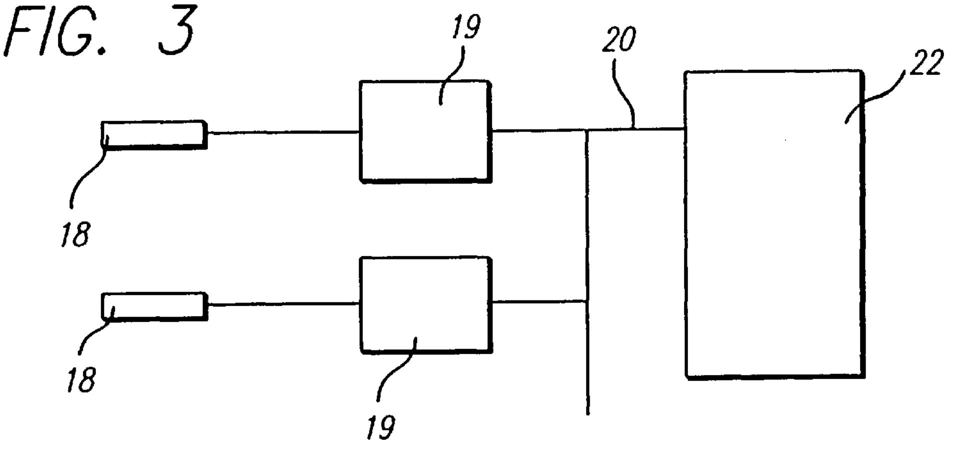
FIG. 4
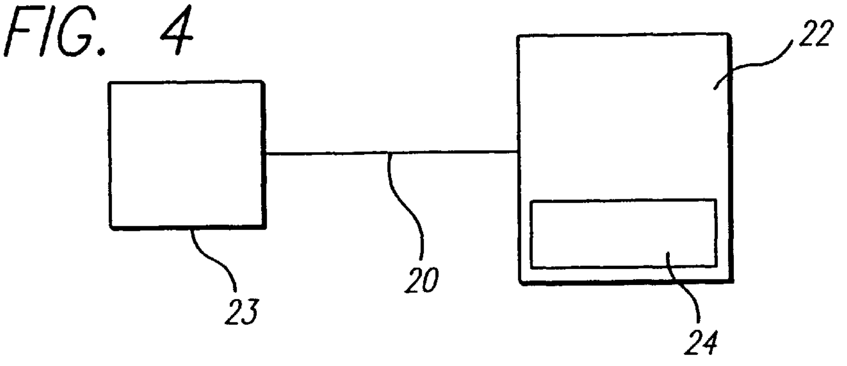
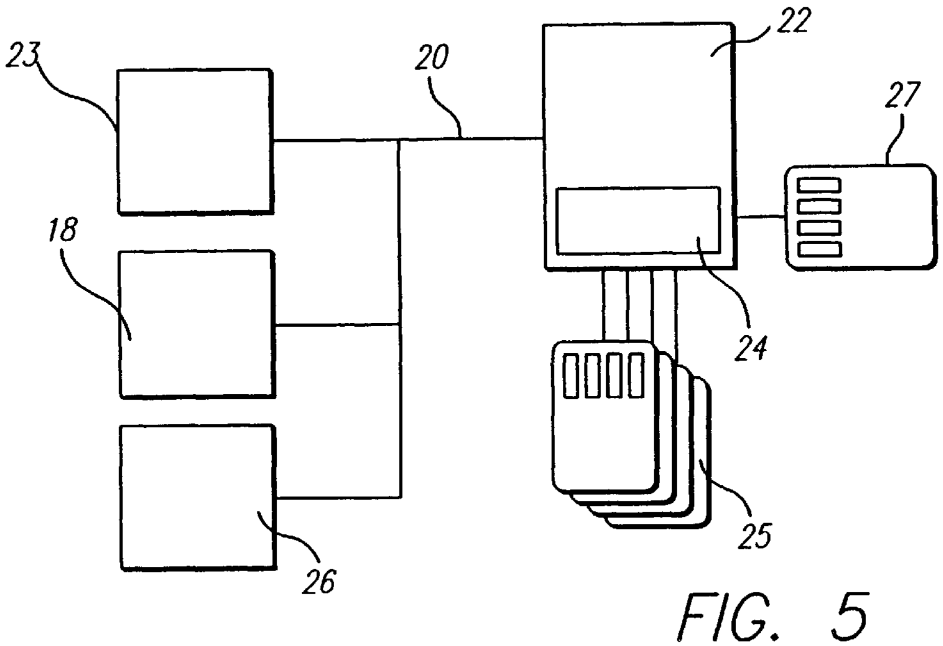
FIG. 5

FIG. 6
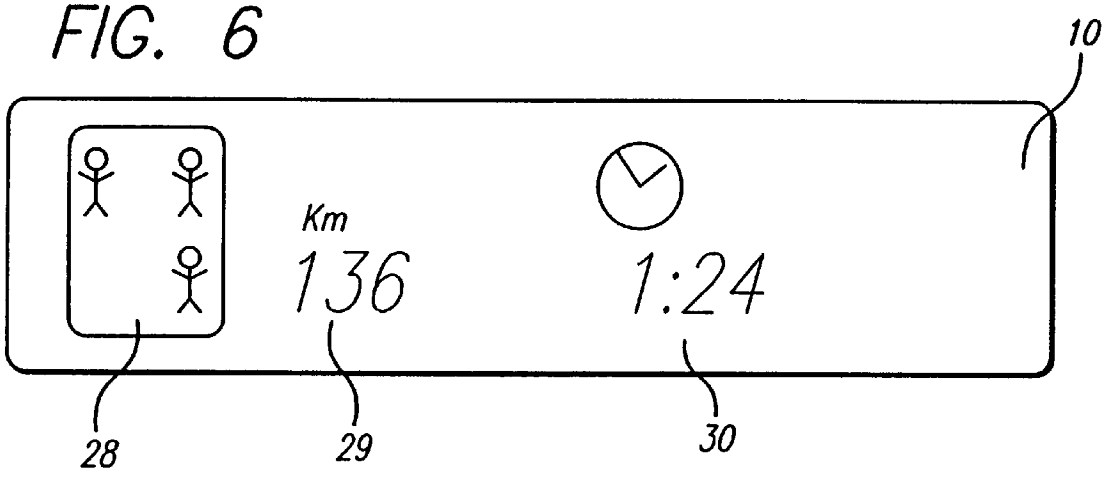
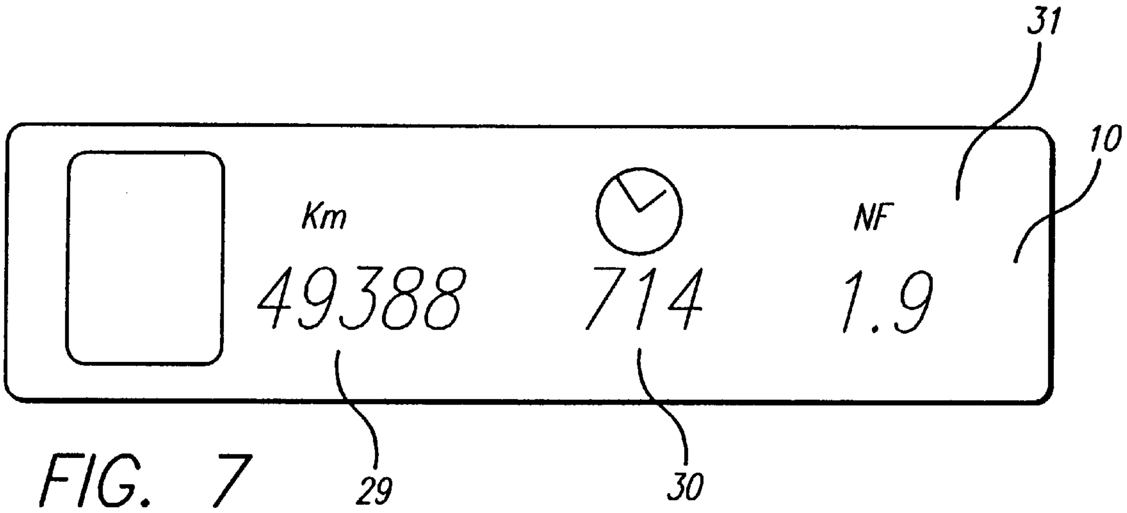
FIG. 7

PROCESS AND DEVICE FOR MEASURING THE OCCUPANCY IN PASSENGER TRANSPORTATION MEANS

BACKGROUND OF THE INVENTION

1. Field of the Invention

The present invention relates generally to a process and device for measuring the occupancy in passenger transportation means.

2. Description of the Prior Art

It is known to carry out passenger occupancy measurements, in particular in public transportation means such as buses, trains, and cable cars as well, whereby at an entrance gate appropriate passenger detectors are operated which perceive the passing through of passengers. For this purpose light barriers, turn stiles or the physical counting of passengers is used. It is the goal of such passenger occupancy measurements to establish the rate of utilization of the vehicle. Present devices suffer from significant disadvantages. For example, although present devices count the number of passengers passing the entrance gate, they cannot relate simultaneously to the number of passengers leaving the means of transportation.

To date it is not known how to carry out such a passenger occupancy measurement in passenger cars. Such an occupancy measurement, however, is extremely desirable as it provides a basis for allowing an increase in person utilization of individual passenger cars in private transportation. A passenger car as fully loaded as possible reduces the number of circulating vehicles. This is of particular importance in conurbations where the number of circulating vehicles should be reduced as much as possible.

Previous concepts regarding so-called traffic reduction were based on the assumption that more vehicles may actually be accommodated in the smallest possible space, e.g., by the building of parking structures, the construction of the appropriate expressways or by means of intelligent traffic management systems that were to assure a more favorable flow of traffic. The proposed systems are very expensive and require large amounts of public money and do not reduce traffic volume, i.e., providing no satisfactory solution to the problem. It has been shown that in industrialized countries, circulating passenger cars are occupied by no more than one or two passengers on average, which results in a low passenger utilization rate factor.

What is needed therefore is an effective process and device for the detection of passenger occupation rates in transportation means.

SUMMARY OF THE INVENTION

The preceding and other shortcomings of prior art processes and devices are addressed and overcome by the present invention which provides a process for tamper-proof measuring of vehicle occupancy in passenger transportation means whereby a counting of the transported persons is carried out and whereby the counting of passengers riding in the people transportation means takes place by means of individually assigned detectors, characterized in that measuring is carried out in such a manner that a manipulation of the measuring with the purpose of increasing the number of passenger is impossible or at least made very difficult and that data acquired is processed, stored and whereby the measurement is executed several times or continuously and whereby the measuring device is disposed completely inside the vehicle.

The present invention also provides a device for the execution of the process.

The foregoing and additional features and advantages of this invention will become apparent from the detailed description and accompanying drawing figures that follow. In the figures and the written description, numerals indicate the various features of the invention, like numerals referring to like features throughout for both the drawing figures and the written description.

BRIEF DESCRIPTION OF THE DRAWINGS

FIG. 1 is a schematic diagram of a device for detection of occupancy utilization in accordance with the present invention;

FIG. 2 is the device according to FIG. 1 with the additional inclusion of reference data;

FIG. 3 is a schematic diagram of a measuring arrangement for the detection of occupants;

FIG. 4 is a schematic diagram of a route recorder;

FIG. 5 is a schematic block diagram of a detection device;

FIG. 6 is a display on a detection device; and

FIG. 7 is a display of utilization data.

DETAILED DESCRIPTION OF THE PREFERRED EMBODIMENTS

The present invention provides a process and device for the detection of passenger occupation rates in transportation means. A further development of this invention increases the passenger utilization factor per vehicle. A doubling of the passenger occupation rate results in the reduction of present circulating vehicles by half.

The invention hereby pursues five different concepts:

(i) Concept 1: Vehicle Data Detection

Utilization data of a vehicle are acquired only. For this purpose every vehicle is provided with a device which measures and stores distance driven and person utilization per km (utilization factor). The recorded data form the basis for the (government) institutions in charge of control measures, e.g., as a basis for financial rewards or extra charges to the vehicle owner.

As a result, the controlling effect extends exclusively to the owner of the vehicle. The precise effect again will depend, however, on the taxation system. If the utilization factor is considered only, the car owner will be motivated to make the fullest use of the vehicle. However, if the distances driven are considered as well, additional motivation to drive less results.

(ii) Concept 2: Vehicle Data Detection With Mileage

Collecting Card For Passengers

This concept will not only acquire vehicle utilization data but also creates the opportunity for persons to collect “passenger miles”. The devices installed in each vehicle are designed such that each passenger can be credited the miles ridden as a passenger to a personal card. These records are the basis for rewarding passengers. The passenger card can furthermore be used as a means of payment for trips as a passenger.

(iii) Concept 3: Comprehensive Traffic Card (an addition to concept 2)

This concept is based on the framework of the passenger card as described in the above scenario. This may be expanded beyond the above described utilization into a personal traffic, or "mobility card". In particular the "mobility card" is seen not only as a possibility for passenger card ride-sharing trips but also as a means of payment or as a pass for the utilization of public transportation vehicles.

(iv) Concept 4: Integration With Road Pricing Systems

The invention allows for the charging of road fees based on vehicle occupation rates. The degree of utilization of a vehicle is reported while in motion to the road-pricing system which automatically calculates the occupation-dependant rate, meaning, the higher the occupation rate, the lower the charges. This finally provides the possibility to financially charge low occupation vehicles which contribute substantially to problem complexes such as parking spaces, traffic jams and emissions in city areas.

(v) Concept 5: Entrance Authorization

The passenger occupation factor may also be used contact-free in the selection of vehicles to be authorized to enter specific conurbations. This authorization may, for example, be granted only if a vehicle is occupied by at least three persons. If the occupation is fewer than three, entrance will not be permitted.

According to a preferred process feature of the present invention, provision is made that a first step in the process detects the number of all persons present in a vehicle by means of so-called person detectors. This acquired person occupation number acquired is entered into a device containing at least one processor and one memory.

This allows for the first time to detect the occupation number of a motor vehicle and to relate this occupation factor with certain other specific reference data. Once the occupation rate of a vehicle is known, this number may be used for further specific processing purposes. It is, for example, possible to automatically output, with or without contact, the number of passengers at toll road entrances and thus to determine the toll rate.

It is also important that the person occupation number of the vehicle be related to additional reference data which should result in specific financial motivation to the vehicle owner for taking along as many passengers as possible. Each vehicle is thus provided with such a device which measures and stores person utilization data per reference value, such as, e.g., per km (mile). At the end of a payment period the data are taken from the vehicle. According to the administrative taxing measures a good occupation rate will be rewarded, e.g., by a lowering of the vehicle tax.

The person occupation factor which is acquired according to the preferred embodiment of the present invention within the vehicle may thus be connected with additional reference values, such as the miles driven by the vehicle, driving time, energy consumption, amount of emissions, number of trips, etc. Similarly, these reference data may be combined with each other and related to the person utilization factor described above.

In order to describe the invention more simply, a simplified exemplary embodiment according to concept 2, which, however, does not limit the scope of the invention, is provided below.

Overview

Each vehicle is provided with a device to measure, record, and display person utilization. Each passenger is provided with a card for the automatic recording of passenger miles. Every place of installation is required to use a device for the initial settings (initialization) of the detection device. Administrative control organizations/agencies (e.g. Tax Office) are provided with equipment to issue, collect and analyze cards.

In accordance with the present invention, every vehicle participating in the system must be equipped with the following devices:

Detection Device

The detection device consists of an occupation display, card slots of an electronic system with a processing unit, and a series of connectors. At the end of each payment period, the collected data is transported from the vehicle to the accounting location by means of the card.

Person Detector

Each seat in a vehicle reliably detects occupants. The system functions in all common vehicle types (even convertibles, mini vans, sports cars). Each seat is monitored during the entire trip. Each detector has a display indicating continuously whether a person is detected. Tampering with the detector is made extremely difficult.

A preferred embodiment of the detector provides for detection of the breathing of occupants in order to thus acquire the number of occupants without error. Instead of such detectors, other data acquisition devices may be used, such as ultrasound detectors, infrared recorders, seat contacts etc.

All that is important in the subject invention is that the number of occupants in the vehicle is detected.

In addition to the vehicle equipment there are essentially 4 other components to the system:

Installation/Initialization of the detection device

For the installation/retrofitting and the initial settings (initialization) of the detection device, a location authorized by the administrative control agency (installation shop) is required. During initialization the detection device is provided with the vehicle-specific data.

"Utilization card", "passenger card"

So-called "smart cards" are used. These are cards in the shape of check cards [credit cards] containing an integrated processor and an electronic memory. These cards are the best possible means to provide security from fraud. Data recording for the vehicle owner takes place on the utilization card. The utilization card remains within the respective detection device for the accounting period (e.g., one year). At the end of the accounting period the cards are sent to the control agency. The utilization card and the detection device are linked by an electronic seal, making any exchanging of cards useless.

The passenger card is carried by the individual. During a ride-sharing trip, the card is inserted into a slot-on the detection device. The passenger km (miles) are recorded on the card. Accounting occurs in the same manner as for the utilization card by sending it to the control agency at the end of the accounting period. The cards may be removed directly at any time.

Records on the utilization card are not influenced by the passenger cards. For the establishment of the occupant factor data from the person detectors are used.

The cards are read out at the end of an accounting period (year) at the control agency (tax authority) by computer. After reading, the accounting data is available through electronic data processing. This data is the basis for the evaluation by the control agency. The system itself does not perform any data analysis, this is the responsibility of the control agency.

The process for the vehicle owner

A vehicle equipped with the system is required. At the beginning of the accounting period, the vehicle owner inserts the utilization card into the detection device in the car and leaves it there until the end of the accounting period.

When transporting passengers, the vehicle owner has nothing to do. At the end of the accounting period the card is removed and replaced by a new one. The old utilization card is forwarded to the control agency. Depending on the occupancy utilization rate, a bonus may be issued. Current utilization data can be checked at any time by displaying them on the detection device. A key allows for the recall of different types of data.

The utilization data of the vehicle are acquired. Utilization data is vehicle occupancy utilization data. Here various different or complementary processes are used for the measurement of occupancy utilization from which the following factors may be calculated:

average occupants number per km [miles]

average occupant number per hour driven average number of occupants per trip Furthermore a combination of data provides the following values:

average distance travelled for the respective number of occupants average duration of the trip for the respective number of occupants average speed for the respective number of occupants The object of this invention does not result merely from the object of the individual claims but also from a combination of the individual claims among each other. All information disclosed including the abstract, disclosed data and features, in particular the spatial embodiments as shown in the drawings, are claimed as essential to the present invention to the extent that they are new individually or in combination with respect to the state of the art.

In particular, referring to FIG. 1, the device 1 is installed in the vehicle according to the aforementioned technical teachings and is essentially equipped with a processor 4 and electronic memory attached thereto. The device 1 is provided with current from a power source 2, which may, for example, branch off the ignition lock containing, however, a permanent power supply. The power supply in device 1 is provided by the supply module 3. The device 1 is provided with a central interface module 5 within which a series of interface switches 7, 9, 11 are arranged.

The most important feature is the detector 6 for the detection of occupants which is designed in accordance with FIG. 3. Additionally, a display 10 may be provided as shown in FIGS. 6 and 7. Furthermore, a data output 8 which is readable without contact may be provided in order to be able to read the occupant utilization number detected without contact with the vehicle.

FIG. 2 depicts additional details of an occupant utilization detection device. Here, the same designation were used for the same modules. In addition, a time module 12 is used by which a specific processor time is provided, and a sensor device 13 is provided in order to make the device 21 safe from fraudulent use.

An acceleration indicator may, for example, monitor the route detection in order to assure reliability and security from falsification of a detected route. The central interface module 5 contains additional interface switches 14, 17. For example, there is a reference data reference module 16 with which specific reference data my be acquired. Such reference data are, for example, distance driven, driving time, energy consumption, emission volume, number of trips, etc. These acquired data are transmitted via reference data module 16 to the interface module 17 and fed to the processor 4 via the central interface module 5.

Furthermore, the vehicle, driver, or passenger may be assigned appropriate memory cards 15, whereby the relevant data is stored on the memory cards 15 which may be removed and forwarded for processing (e.g., by the tax agency) at any time.

FIG. 3 shows the exemplary embodiment of a person detector 6 whereby the presence of a person is established by means of a person detection module 18. The corresponding signal is fed via an evaluation switch 19 to a bus conduit 20 which then feeds the acquired signals to the detection device 22.

FIG. 4 is a schematic representation showing that the signal of a route detection recorder 23 may also be relayed to the bus conduit 20 and then fed to the detection device 22. For a plausibility test of the signal the detection device 22 may also be provided with subsystems 24.

FIG. 5 is a schematic representation of a combined arrangement whereby it can be seen that the route recorder according to FIG. 4 together with the occupant detection module 18 and a card reading device 26 acts on the common bus 20, whose signals are fed to the detection device 22. A utilization card 27 which is readable and upon which data may be stored may hereby be assigned to the vehicle itself.

FIGS. 6 and 7 indicate an exemplary embodiment of a display of such an device 1, 21. In display 10, which may, for example, be provided as an LCD-display, the first window 28 shows the number of occupants as symbols. An additional window 29 shows the actual route driven and a third window 30 displays the actual driving time.

According to FIG. 7 the display 10 may also serve for the recall of utilization data. For this, the window 29 displays the total distance driven by the vehicle per a specific time unit, window 30 the total driving time and an additional window the utilization factor of the vehicle. In the case displayed, the occupant utilization factor is about 2 persons per km.

The process of the invention and the device described allow for the first time the establishment of a occupant utilization factor per vehicle which is very important for the future since this presents the only solution for a possible increase in the density of person transportation capacity of passenger cars. It goes without saying that control measures described above must be applied.

It will be appreciated by persons skilled in the art that the present invention is not limited to what has been shown and described hereinabove, nor the dimensions of sizes of the physical implementation described immediately above. The scope of the invention is limited solely by the claims which follow.

What is claimed is:

1. A process for tamper-proof measuring of vehicle occupancy of passengers in transportation means, comprising the steps of:

(1) disposing a measuring device completely inside the transportation means for automatic recording of passenger utilization data, said measurement being executed several times or continuously;

(2) automatically counting the number of passengers in the transportation means utilizing passenger detecting means individually assigned to each seat of the transportation means, said detecting means being sensitive solely to specific physical characteristics identifiable with human beings comprising breathing frequency, heartbeat, body move thereby assuring that the number of persons measured in the vehicle does not exceed the number of persons actually present, so that manipulation of occupancy data by deceitfully increasing the number of passengers is possible or at least made very difficult; and (3) processing, storing and displaying the data recorded in the measuring device.

2. The process according to claim 1, wherein the data acquired in connection with passenger utilization are machine readable, read with or without contact, or output from the transportation means.

3. The process according to claim 1, wherein the passenger utilization data is linked with additional reference data, including one or more of miles driven, time driven, energy consumption, emission volume, and numbers of trips to create statistical data and/or motivation of a financial nature, regarding the taking along of passenger.

4. The process according to claim 3, wherein the data acquired by the measuring device at the end of accounting periods is output from the transportation means for evaluation and invoicing purposes.

5. The process according to claim 1, wherein the passengers to be detected are individually assigned a card which is connected with the measuring device for automatic recording of data.

6. The process according to claim 1 wherein said physical characteristic is breathing.

7. A device for tamper-proof measuring of vehicle occupancy of passengers in transportation means, comprising:

(1) a measuring device installed on the transportation means for detecting, processing, storing and displaying of passenger utilization data including the number of passengers in the transportation means; and (2) passenger detecting means individually assigned to each seat of the transportation means and connected with the measuring device for automatic recording of the passenger utilization data, said detecting means being sensitive solely to specific physical characteristics identifiable with human beings comprising breathing frequency, heartbeat and body movement.

8. The device according to claim 7, wherein the measuring device further comprises an internal sensor system for plausibility check of data detected.

9. The device according to claim 8, wherein said internal sensor system further comprises an acceleration sensor to check distance traveled and similar data.

10. The device according to claim 7, which further includes route recorder means, a passenger detection module and an evaluating switch and wherein passengers are detected in connection with said route recorder via said passenger detection module, whereby data is fed via a bus conduit to the measuring device through said evaluation switch.

11. The device according to claim 7 wherein said detecting means is sensitive to breathing.

* * * * *

UNITED STATES PATENT AND TRADEMARK OFFICE
CERTIFICATE OF CORRECTION

PATENT NO. : 5,920,057

DATED : July 6, 1999

INVENTOR(S) : Sonderegger et al.

It is certified that error appears in the above-identified patent and that said Letters Patent is hereby corrected as shown below:

Col. 7, Claim 1, line 11 states: ...of passengers is possible or at least..." and correctly should read: "...of passengers is impossible or at least...".

Signed and Sealed this

Sixteenth Day of May, 2000

*Attest:*

Q. TODD DICKINSON

*Attesting Officer* *Director of Patents and Trademarks*